Figure 1:
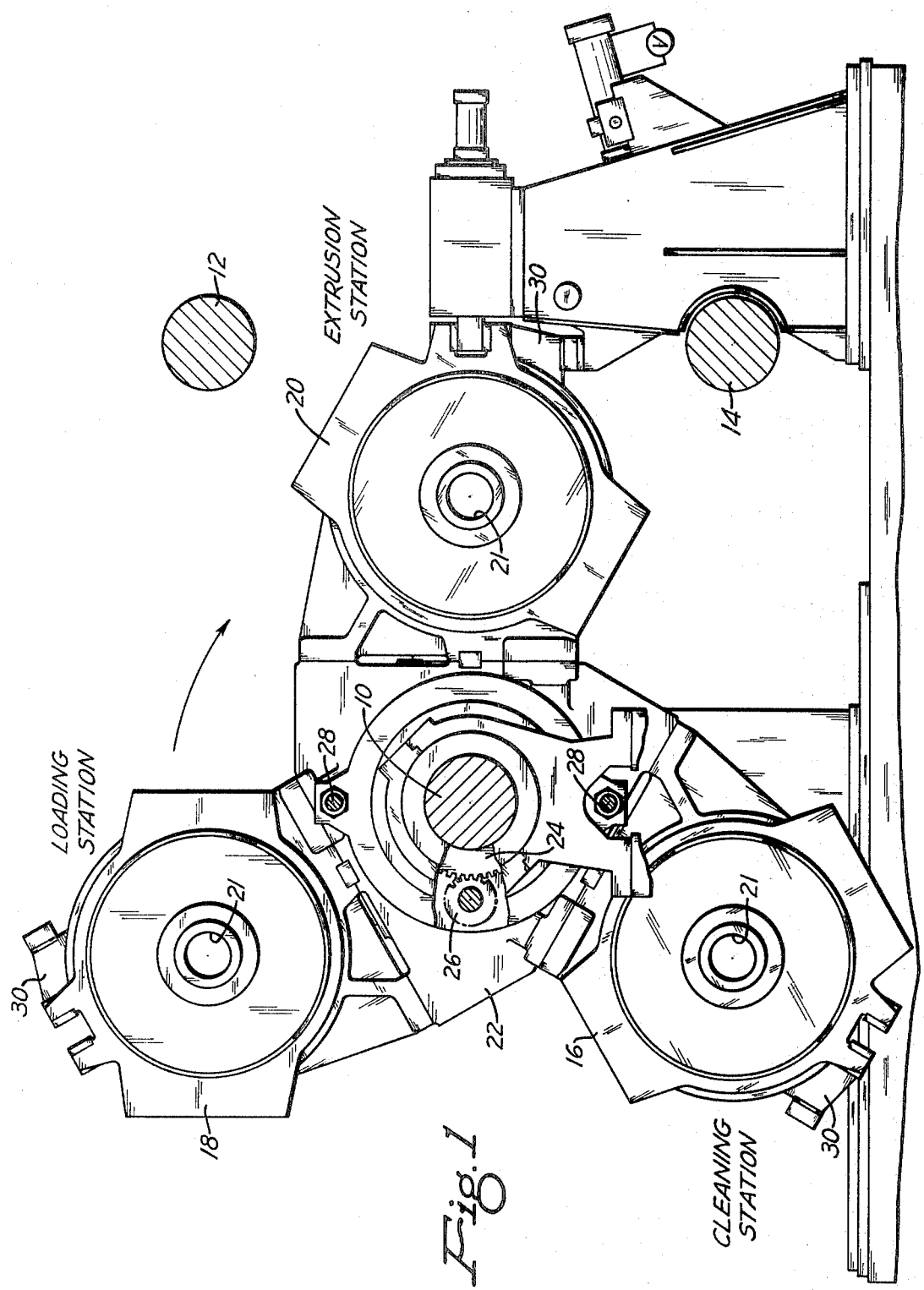

United States Patent [19]
Kent et al.

[11] 3,839,894
[45] Oct. 8, 1974

[54] POSITIONING APPARATUS FOR CONTAINERS OF EXTRUSION PRESSES

[75] Inventors: Francis J. Kent, Wallingford; George M. Jaworski, Narberth, both of Pa.

[73] Assignee: Wean United, Inc., Pittsburgh, Pa.

[22] Filed: May 14, 1973

[21] Appl. No.: 360,268

[52] U.S. Cl. .................................. 72/263, 72/272
[51] Int. Cl. ........................................... B21c 23/00
[58] Field of Search .......................... 72/263, 272

[56] References Cited
UNITED STATES PATENTS

| | | | |
|---|---|---|---|
| 3,197,994 | 8/1965 | Samuel | 72/263 |
| 3,359,770 | 12/1967 | Asari | 72/263 |
| 3,611,778 | 10/1971 | Hubert | 72/272 |

*Primary Examiner*—C. W. Lanham
*Assistant Examiner*—Robert M. Rogers
*Attorney, Agent, or Firm*—Henry C. Westin; Daniel Patch

[57] ABSTRACT

The disclosure of the present invention pertains to a device for stopping and accurately registering one or more containers of an extrusion press adapted to produce rod or tube products. There is disclosed a rotating hub to which three containers are secured for rotation by the hub into three radially located stations, two being preparation stations and the remaining one an extrusion station. In the vicinity of the extrusion station a pivotal stop is arranged having an extended position, in which position it is engageable by a container being rotated into the extrusion station and a retracted position where the stop allows a container in the extrusion station to pass to the next station. Also in the vicinity of the extrusion station a latch and key is provided being movable into an opening formed in the containers when the containers are in the extrusion station, the latch and key serving to accurately position the containers relative to the die of the press yet allowing the container to move axially thereof.

8 Claims, 2 Drawing Figures

POSITIONING APPARATUS FOR CONTAINERS OF EXTRUSION PRESSES

Present day presses employing multiple containers have suffered from the inability to provide a simple, dependable and accurate mechanism for quickly stopping the containers in the pressing station and accurately positioning a container relative to the center axis of the press while allowing the container to move axially relative to this axis. One mechanism presently employed is a high inertia electrical motor and brake system used to advance, stop and position the containers.

It is an object of the present invention to provide an improved mechanism for stopping and accurately positioning a container or containers of a press, such as an extrusion, forging or shaping press.

More particularly, it is an object of the present invention to provide a container engaging means for absorbing the shock in stopping the container in a desired position and for positioning the container in the desired position and means for accurately maintaining the container in said desired position.

Still more particularly, the present invention provides a stop means and means for moving the stop means into a position to be contacted by a container when rotated into the extrusion station of an extrusion press to absorb the shock in bringing the container to a stop and in positioning the container in said station, a latch and key means and means for moving this means in contact with a container when so positioned to, if necessary, more accurately position and maintain the container in said station while permitting the container to be moved axially relative to the die of the press.

Figure 2:
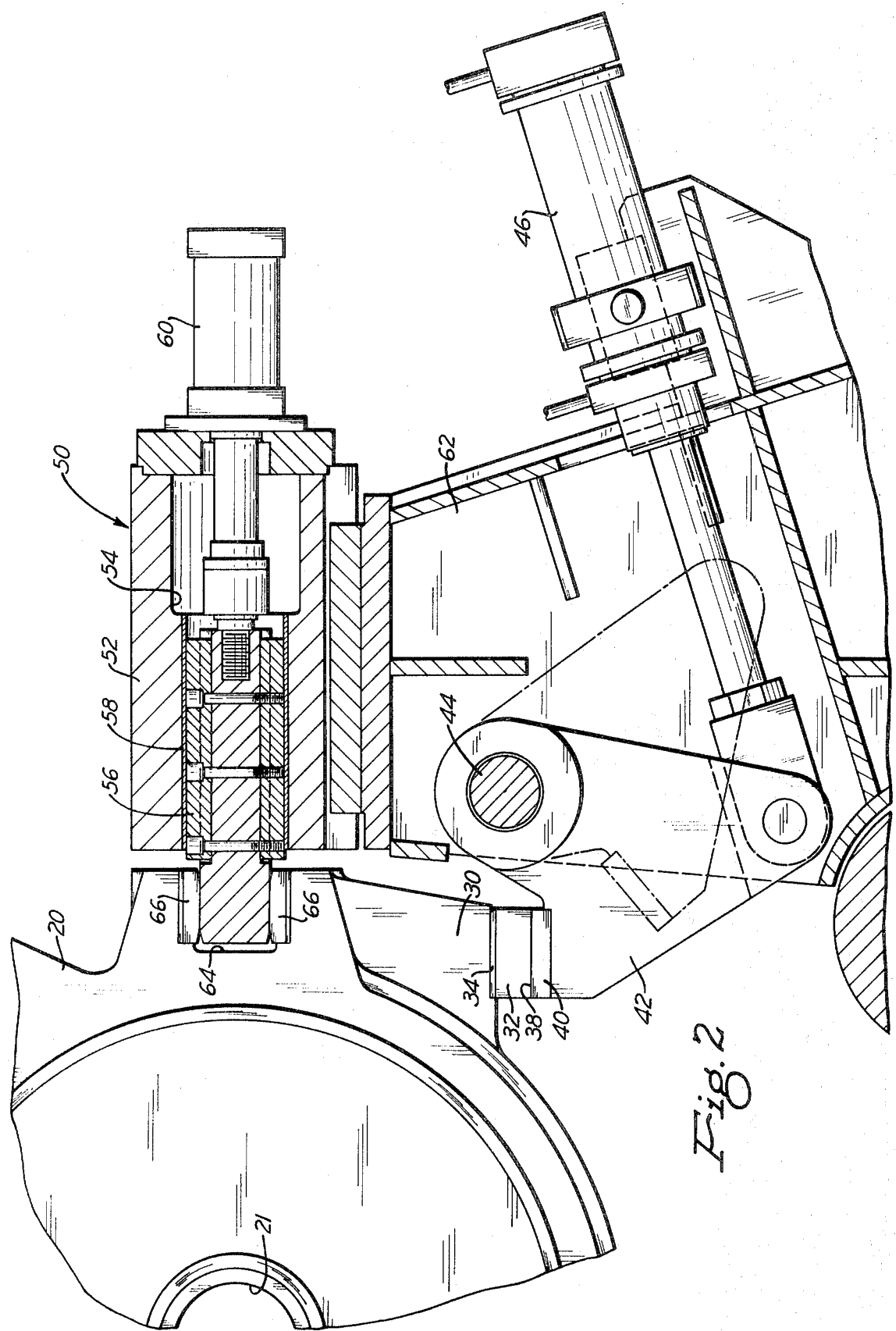

These objects, as well as other novel features and advantages of the present invention, will be better appreciated when the following description of one embodiment thereof is read along with the accompanying drawings of which:

FIG. 1 is an elevational view illustrating a positioning apparatus for the container of an extrusion press, and FIG. 2 is an enlarged view of the positioning apparatus shown in FIG. 1.

In referring first to FIG. 1, there are shown three tension columns 10, 12 and 14 of an extrusion press, not otherwise shown. The columns as well as other components of the press follow well-known designs as does the employment and construction of the multiple containers. The particular arrangement illustrated employs three containers 16, 18 and 20: a container 16 being shown in a cleaning station; a container 18 in a loading station; and a container 20 in an extrusion station, which stations are legended in the drawings. The containers having billet receiving openings 21 are each secured to a common hub 22 which is mounted concentric with the column 10 about which it rotates. The hub is located, as usual, between the crosshead and platen of the press, and in addition to being rotated, also moves axially of the column 10 so that the container in the extrusion station can be brought towards and away from the die mounted adjacent the inner face of the press platen. Rotational movement of the hub 22 may typically be accomplished by a gear 24 associated with the hub and a clutch, not shown, the gear 24 being driven by a motor driven gear 26. The axial movement of the containers, as customary, is accomplished by piston cylinder assemblies 28.

As noted by the arrow in the drawing, the hub 22 and the containers 16, 18 and 20 are rotated in a clockwise direction. Each container is provided with a lug 30 located at about 5 o'clock when in the extrusion station as can be seen in referring to the container 20. To the lugs, as best shown in FIG. 2, there are secured bars 32 separated by readily replaceable shim plates 34 engageable by a similar surface 38 formed on a bar 40 secured to a hinged or pivotal stop member 42. A turning pin 44 supports the stop member 42 and provides the stop with two positions, one being a container stopping position shown in full line in FIG. 2 and the other an ambushed position shown in phantom line, in which position the container 20 is free to move to the next station. An hydraulic piston cylinder assembly 46 is employed to move the stop member 42 to its extended and retracted positions, the cylinder assembly being associated with an adjustable flow control valve 48, shown only in FIG. 1, that regulates the discharge of the fluid from the cylinder, thereby, if necessary, to absorb and cushion the shock of the forcible contact between the containers and the stop member 42 when the containers are rotated into the extruding station. In the preferred operation, the piston cylinder assembly 46 allows the container to overrun the desired position and after stopping it, the cylinder pushes the container back to the horizontal centerline position of the press. The shims 34 provide a reliable and convenient procedure for taking up any lost motions in the associated parts and allowing each container to be independently positioned reasonably accurate relative to the extruding station and more particularly relative to the die of the press.

Directly above the pin 44 and arranged on the horizontal centerline of the press is a latch and key mechanism 50 comprising a stationary housing 52 having an opening 54 into which is received in the end adjacent the container 20 an horizontal slidable bar member 56. Guiding liners 58 are provided in the opening 54 to provide for a well-confined movement of the bar member which is imparted by a piston cylinder assembly 60. The housing 52 is supported by a stand 62 which also serves as the support for the pin 44 and the piston cylinder assembly 46 of the stop member 42. The outer end of the bar member 56 is enlarged and shaped to project into openings or keyways 64 formed in the outer periphery of each container 16, 18 and 20. As shown in FIG. 2, these openings 64 when in the extrusion station fall on the horizontal centerline of the press, that is about 3 o'clock as viewed in the drawings. The horizontal opposite surfaces of the openings or keyways 64 are provided with readily replaceable shimmed adjustable wearplates 66 having their ends beveled to accommodate the easy entry of the bar member 56, and more particularly, to allow a positioning of the containers precisely on the horizontal centerline of the press, in the event the position of the container as effected by the piston cylinder assembly 46 is not precisely correct.

The shims 66 are also designed to not only maintain the container in an accurate aligned relationship with the die of the press, but to also, while so holding the container, allow the container to move axially relative to the die. As in the case of the shims 34, the shims 66 allow each container 16, 18 and 20 to be individually adjusted relative to the latch and key mechanism 50 and hence the die of the press.

In operation, with the latch and key mechanism 50 retracted by the piston cylinder assembly 60 and the stop member 42 in its retracted position by operation of the piston cylinder assembly 46, the hub is free to rotate the containers 16, 18 and 20 into their next station. As the next container is brought into the extrusion station its bar 32 will abut against the extended stop member 42, which will have been previously positioned by operation of the piston cylinder assembly 46 and its kinetic energy after stoppage of the power means for rotating the hub will be absorbed or cushioned by the piston cylinder assembly as controlled by the flow control valve 48. In addition to cushioning and bringing the container to a stop, the piston cylinder assembly 46 will cause the container, if necessary, to come to rest in the desired position relative to the horizontal centerline of the press by pushing it back to this position should it override it on its rotation. The latch and key mechanism 50 will then be advanced from its retracted position by operation of the piston cylinder assembly 60 to accurately position the container precisely in line with the horizontal centerline of the press. In addition to so positioning the container, the latch and key mechanism 50 will maintain the container in this position even while the container is being moved axially during which movement the wearplates 66 are restrictively contacted by the adjacent surfaces of the bar member 56.

In accordance with the provisions of the patent statutes, we have explained the principles and operation of our invention and have illustrated and described what we consider to represent the best embodiment thereof.

We claim:

1. In combination with a press,
   a number of rotatable container assemblies adapted to be brought in succession into a pressing station of said press,
   a surface formed on each container adapted on movement into said station to expose itself for contact with a container positioning means,
   a container positioning means having a stop member adapted to contact each of said surfaces of said containers when brought to said station to cause said containers when so brought to be positioned in a desired position in said station,
   means for supporting said stop member to position the stop member in a first position to engage said container surface and in a second position where on movement of said container from said station the stop member is displaced so as not to interfere with said movement,
   wherein said stop member is moved into said two positions by a fluid piston cylinder assembly connected to said stop member, and
   a fluid control means for controlling the resistance offered by said piston cylinder assembly so as to cushion the stoppage of said container when brought to said station and to position said container in said station.

2. In combination with a press according to claim 1, wherein said container surfaces include readily replaceable shims adapted to serve as said exposed surfaces.

3. In combination with a press according to claim 1, wherein said container positioning means includes a latch and key means,
   means for supporting said latch and key means in a position to engage a container surface and in a second position free of said engagement, and
   means for moving said latch and key means into said two positions.

4. In combination with a press according to claim 3, wherein said container surfaces include openings in the outer peripheries of said containers,
   said latch and key means having a member adapted to fit into said openings to effect said engagement of a container and said latch and key means.

5. In combination with a press according to claim 4, wherein said member includes at least one readily replaceable shim arranged to serve as its engageable surface.

6. In combination with a press having a number of rotatable container assemblies adapted to be brought in succession into a pressing station of said press,
   a surface formed on each container adapted on movement into said station to expose itself for contact with a stop member,
   a stop member having a surface adapted to be engaged by said container surfaces when said containers are brought into said station,
   means for supporting said stop member in a first position to engage said container surfaces and in a second position where on movement of a container from said station the stop member is displaced so as not to interfere with said movement,
   means for moving said stop member into said two positions, said containers each having an opening on their outer peripheries arranged on the center pressing axis of the press when in said station,
   a latch and key means arranged on said press centerline in which in a first position it is received in said opening of a container when in said station and in a second position it is free of said opening, and
   means for moving said latch and key means into said two positions.

7. In combination with a press according to claim 6, wherein said means for moving said stop member includes a fluid piston cylinder assembly and adjustable means for controlling the resistance offered by said piston cylinder assembly for cushioning the stoppage of the containers when brought to said station and for positioning a container in said station.

8. In combination with a press according to claim 6, wherein said latch and key means includes means projecting in a direction normal to the direction of the major axis of the opening of said containers for accurately maintaining a container in said station while allowing a so maintained container to move in a direction axially of its opening.

* * * * *